(12) United States Patent
Kumano et al.

(10) Patent No.: US 11,237,547 B2
(45) Date of Patent: Feb. 1, 2022

(54) INFORMATION PROCESSING DEVICE, INFORMATION PROCESSING METHOD, AND PROGRAM

(71) Applicants: MITSUBISHI HEAVY INDUSTRIES, LTD., Tokyo (JP); MITSUBISHI HITACHI POWER SYSTEMS, LTD., Yokohama (JP)

(72) Inventors: Shintaro Kumano, Tokyo (JP); Makoto Kishi, Tokyo (JP); Katsuhiko Abe, Yokohama (JP); Keisuke Yamamoto, Tokyo (JP)

(73) Assignees: MITSUBISHI HEAVY INDUSTRIES, LTD., Tokyo (JP); MITSUBISHI POWER, LTD., Yokohama (JP)

( * ) Notice: Subject to any disclaimer, the term of this patent is extended or adjusted under 35 U.S.C. 154(b) by 141 days.

(21) Appl. No.: 16/497,023

(22) PCT Filed: Mar. 26, 2018

(86) PCT No.: PCT/JP2018/012020
§ 371 (c)(1),
(2) Date: Sep. 24, 2019

(87) PCT Pub. No.: WO2018/181120
PCT Pub. Date: Oct. 4, 2018

(65) Prior Publication Data
US 2020/0110393 A1    Apr. 9, 2020

(30) Foreign Application Priority Data

Mar. 29, 2017  (JP) .............................. JP2017-065921

(51) Int. Cl.
*G05B 23/02*  (2006.01)
*G05B 19/042* (2006.01)
(Continued)

(52) U.S. Cl.
CPC ..... *G05B 23/0235* (2013.01); *G05B 19/0428* (2013.01); *G05B 23/0221* (2013.01);
(Continued)

(58) Field of Classification Search
CPC ............ G05B 23/0235; G05B 19/0428; G05B 23/0221; G05B 19/042; G05B 23/00;
(Continued)

(56) References Cited

U.S. PATENT DOCUMENTS 5,701,394 A * 12/1997 Arita .................... G05B 13/029
706/10
6,519,715 B1 * 2/2003 Takashi ............ G11B 20/00086
360/53
(Continued)

FOREIGN PATENT DOCUMENTS

JP    2005-267572 A    9/2005
JP    2006-064307 A    3/2006
(Continued)

OTHER PUBLICATIONS

International Search Report dated Jun. 5, 2018, issued in counterpart Application No. PCT/JP2018/012020 (4 pages).
(Continued)

*Primary Examiner* — Daniel R Miller
*Assistant Examiner* — Christian T Bryant
(74) *Attorney, Agent, or Firm* — Westerman, Hattori, Daniels & Adrian, LLP

(57) ABSTRACT

In an information processing device according to the present invention, an acquisition unit is configured to acquire a plurality of values related to a state quantity of a target device. An extraction unit is configured to extract a state value group constituted by a plurality of values related to an identical state quantity from the acquired plurality of values. A specification unit is configured to specify a value to be
(Continued)

used to manage the target device from the state value group based on reliabilities of the values included in the state value group.

10 Claims, 9 Drawing Sheets

(51) Int. Cl.
| | |
|---|---|
| *G06F 17/40* | (2006.01) |
| *G08C 15/00* | (2006.01) |
| *G05B 21/00* | (2006.01) |
| *G08C 25/00* | (2006.01) |
| *G05B 23/00* | (2006.01) |
| *G01D 9/00* | (2006.01) |
| *G01D 18/00* | (2006.01) |
| *G01D 1/00* | (2006.01) |
| *H04L 5/00* | (2006.01) |
| *G06F 15/00* | (2006.01) |
| *G06F 11/00* | (2006.01) |

(52) U.S. Cl.
CPC .............. *G01D 1/00* (2013.01); *G01D 9/00* (2013.01); *G01D 18/00* (2013.01); *G05B 19/042* (2013.01); *G05B 21/00* (2013.01); *G05B 23/00* (2013.01); *G06F 11/00* (2013.01); *G06F 15/00* (2013.01); *G06F 17/40* (2013.01); *G06F 2201/00* (2013.01); *G08C 15/00* (2013.01); *G08C 25/00* (2013.01); *H04L 5/00* (2013.01)

(58) Field of Classification Search
CPC .......... G05B 21/00; H04L 5/00; G08C 15/00; G08C 25/00; G01D 1/00; G01D 18/00; G01D 9/00; G06F 11/00; G06F 15/00; G06F 17/40; G06F 2201/00
See application file for complete search history.

(56) References Cited

U.S. PATENT DOCUMENTS

| | | | |
|---|---|---|---|
| 2004/0199368 A1* | 10/2004 | Bechhoefer | G05B 23/0235 703/7 |
| 2006/0136175 A1 | 6/2006 | Suzuki et al. | |
| 2010/0274833 A1* | 10/2010 | Hirohata | H04L 41/145 709/202 |
| 2011/0004885 A1* | 1/2011 | Kikuchi | H04L 41/5096 718/104 |
| 2011/0213559 A1 | 9/2011 | Pollack et al. | |
| 2013/0169447 A1* | 7/2013 | Hiramatsu | G06F 1/206 340/691.6 |
| 2014/0298113 A1* | 10/2014 | Sakurai | G06F 11/2028 714/47.3 |
| 2015/0278325 A1* | 10/2015 | Masuda | H04Q 9/00 707/624 |
| 2015/0363249 A1* | 12/2015 | Mizobuchi | H04L 41/00 714/47.3 |
| 2016/0004794 A1 | 1/2016 | Reimann et al. | |

FOREIGN PATENT DOCUMENTS

| | | |
|---|---|---|
| JP | 2012-158700 A | 8/2012 |
| JP | 2013-239013 A | 11/2013 |
| WO | 2014/091952 A1 | 6/2014 |
| WO | WO-2015182831 A1 * | 12/2015 ............ G06F 11/079 |

OTHER PUBLICATIONS

Written Opinion dated Jun. 5, 2018, issued in counterpart Application No. PCT/JP2018/012020, with English Translation (10 pages).

\* cited by examiner

INFORMATION PROCESSING DEVICE, INFORMATION PROCESSING METHOD, AND PROGRAM

TECHNICAL FIELD

The present invention relates to an information processing device, an information processing method, and a program.

The application is based on Japanese Patent Application No. 2017-065921 filed on Mar. 29, 2017, the content of which is incorporated herein by reference.

BACKGROUND OF THE INVENTION

In a plant such as a power generation plant, it has been investigated to configure a monitoring device to collect state quantity values of a device constituting the plant such as a temperature and a pressure at the time of the operation of the device to use the collected state quantity values to maintain and monitor the device.

In addition, it has been proposed that the monitoring device is configured to process the collected state quantity values such that an operator of the device can easily use them and execute the maintenance, monitoring, and the like of the device. For example, in Patent Document 1, it is proposed that a model building platform is configured to detect missing portions of collected industrial plant parameters and complement the detected missing portions on the basis of past industrial plant parameters.

PATENT DOCUMENTS

Patent Document 1: United States Patent Application, Publication No. 2016/0004794

SUMMARY OF THE INVENTION

Problems to be Solved by the Invention

The measurement of operation data of a device has been widely performed by a plurality of measurement instruments according to applications such as failure detection and performance determination of the device, and each of the plurality of measurement instruments may measure a plurality of values for an identical state quantity at corresponding timings. In this case, it is difficult to set state quantity values for maintenance and monitoring to be managed by the monitoring device.

According to the method proposed in Patent Document 1 and the like, it is possible to complement missing state quantity values, but it is difficult to appropriately manage overlapping values.

The present invention is contrived in view of the above-described problems, and an object thereof is to appropriately specify state quantity values used to manage a target device in a case where overlapping values are acquired for a state quantity of the target device.

Means to Solve the Problems

According to a first aspect of the present invention, an information processing device includes an acquisition unit that is configured to acquire a plurality of values related to a state quantity of a target device, an extraction unit that is configured to extract a state value group constituted by a plurality of values related to an identical state quantity from the acquired plurality of values, and a specification unit that is configured to specify a value to be used to manage the target device from the state value group based on reliabilities of the values included in the state value group.

According to a second aspect of the present invention, in the information processing device according to the first aspect, the state value group is constituted by a time series of the plurality of values related to an identical state quantity in an identical period, and the specification unit is configured to specify a time series of values to be used to manage the target device in the period from the state value group based on a reliability of a time series of the values in the state value group.

According to a third aspect of the present invention, in the information processing device according to the second aspect, the specification unit is configured to specify a time series of values to be used to manage the target device in the period from the state value group based on a difference between reliabilities of time series in the state value group.

According to a fourth aspect of the present invention, in the information processing device according to any one of the first to third aspects, the acquisition unit is configured to acquire a plurality of measurement values related to a state quantity of the target device from a measurement instrument provided in the target device, and acquire an estimation value by estimating other state quantities based on the measurement values.

According to a fifth aspect of the present invention, in the information processing device according to the fourth aspect, the acquisition unit may acquire an estimation value related to a state quantity of the target device based on a measurement value related to a state quantity of a device different from the target device.

According to a sixth aspect of the present invention, the information processing device according to any one of the first to fifth aspects may further include a complementary unit that is configured to complement a value of the state quantity related to a time having no value related to the state quantity based on a value specified by the specification unit.

According to a seventh aspect of the present invention, the information processing device according to any one of the first to sixth aspects may further include a comparison value calculation unit that is configured to calculate a comparison value which is a value related to another state quantity by using values included in the state value group, and a reliability calculation unit that is configured to calculate reliabilities of values included in the state value group based on a difference between the value of the other state quantity acquired by the acquisition unit and a comparison value calculated by the comparison value calculation unit.

According to an eighth aspect of the present invention, in the information processing device according to any one of the first to seventh aspects, the specification unit is configured to specify a value to be used to manage the target device based on a statistic of values included in the state value group.

According to a ninth aspect of the present invention, in the information processing device according to the first to eighth aspects, the specification unit is configured to specify a weighted average value of the values related to the state value group using weights corresponding to the reliabilities of the values included in the state value group as a value to be used to manage the target device.

According to a tenth aspect of the present invention, an information processing method includes acquiring a plurality of values related to a state quantity of a target device, extracting a state value group constituted by a plurality of values related to an identical state quantity from the acquired plurality of values, and specifying a value to be used to manage the target device from the state value group based on reliabilities of the values included in the state value group.

According to an eleventh aspect of the present invention, a program causes a computer to acquire a plurality of values related to a gate quantity of a target device, extract a state value group constituted by a plurality of values related to an identical state quantity from the acquired plurality of values, and specify a value to be used to manage the target device from the state value group based on reliabilities of the values included in the state value group.

Effects of the Invention

According to at least one aspect among the above-described aspects, the information processing device specifies values used for management based on a reliability in a case where a plurality of values related to a identical state quantity are acquired. Thereby, the information processing device can appropriately specify state quantity values used to manage a target device even when overlapping values are acquired as a state quantity of the target device.

EMBODIMENTS FOR CARRYING OUT THE INVENTION

First Embodiment

Figure 1:
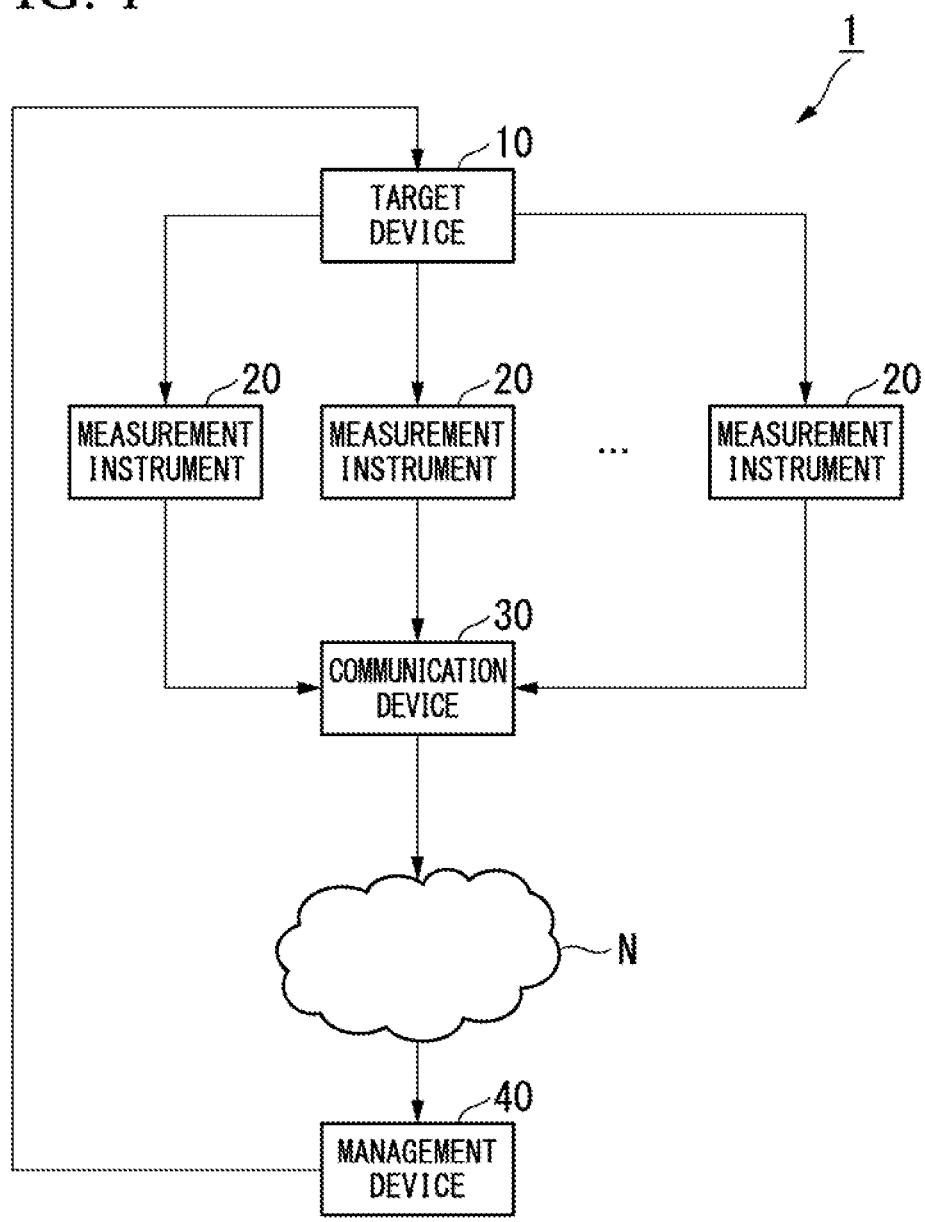
FIG. 1 is a schematic block diagram showing a configuration of a management system according to a first embodiment.

Hereinafter, embodiments will be described in detail with reference to the accompanying drawings.
<Overall Configuration>
FIG. 1 is a schematic block diagram showing a configuration of a management system according to a first embodiment.

A management system 1 includes a target device 10, a plurality of measurement instruments 20, a communication device 30, and a management device 40.

The target device 10 is a device to be managed by the management device 40. Examples of the target device 10 include a gas turbine, a steam turbine, a boiler, a coal gasification furnace, and the like. In addition, the target device may be an environmental plant, a chemical plant, or a transportation system such as an aircraft.

The measurement instrument 20 is provided in the target device 10 and is configured to measure a state quantity of the target device 10.

The communication device 30 is configured to transmit a measurement value of the state quantity measured by the measurement instrument 20 to the management device 40 through a network N.

Figure 2:
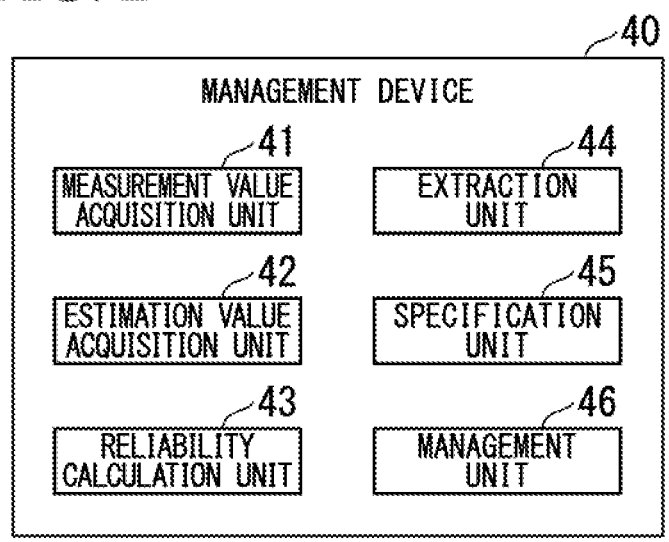
FIG. 2 is a schematic block diagram showing a configuration of a management device according to the first embodiment.

The management device 40 is configured to manage the target device 10 based on the measurement value received from the communication device 30. The management device 40 is an example of an information processing device.
<Configuration of Management Device>
FIG. 2 is a schematic block diagram showing a configuration of the management device according to the first embodiment.

The management device 40 includes a measurement value acquisition unit 41, an estimation value acquisition unit 42, a reliability calculation unit 43, an extraction unit 44, a specification unit 45, and a management unit 46.

The measurement value acquisition unit 41 is configured to receive measurement values of a state quantity measured by a plurality of measurement instruments 20 from the communication device 30.

The estimation value acquisition unit 42 is configured to estimate state quantity values based on the measurement values acquired by the measurement value acquisition unit 41 to acquire estimation values. For example, the estimation value acquisition unit 42 may be configured to estimate a value of a state quantity to be estimated (for example, a pressure of a combustor) by substituting a measurement value related to another state quantity not to be estimated (for example, a temperature of the combustor) into a predetermined numerical expression. In addition, for example, the estimation value acquisition unit 42 may be configured to estimate a value of a state quantity of the target device 10 (for example, a temperature of the combustor) based on a value of an operation quantity of the target device 10 (for example, a fuel flow rate). In addition, for example, the estimation value acquisition unit 42 may be configured to analogize a value of a state quantity of an equipment to be estimated which constitutes the target device 10 (for example, an ambient temperature of a compressor of a gas turbine) by using a measurement value of a state quantity related to an equipment other than the equipment to be estimated (for example, an ambient temperature of an electric motor connected to the gas turbine). In addition, for example, the estimation value acquisition unit 42 may be configured to analogize a value of a state quantity of the target device 10 (for example, a temperature of a combustor of a gas turbine provided at a place A) by using a measurement value of a state quantity related to a device other than the target device 10 (for example, a temperature of a combustor of a gas turbine provided at a place B). In addition, for example, the estimation value acquisition unit 42 may be configured to estimate values of a state quantity at times during a measurement period of the measurement instrument 20 based on a measurement value obtained by the measurement instrument 20. In addition, the estimation value acquisition unit 42 may be configured to acquire an estimation value calculated in advance based on the measurement value from an external device.

The measurement value acquisition unit 41 and the estimation value acquisition unit 42 are examples of acquisition units configured to acquire a plurality of values related to a state quantity of the target device.

The reliability calculation unit 43 is configured to calculate reliabilities related to measurement values and estimation values. The reliability calculation unit 43 is configured to calculate reliabilities of measurement values and estimation values based on, for example, a table or a relational expression showing a relationship between measurement values and reliabilities, or a known reliability of the measurement instrument 20.

For example, in the measurement instrument 20, the magnitude of an error may change depending on the magnitude of a state quantity of an object to be measured. In general, when the magnitude of the state quantity exceeds a measurement target range of the measurement instrument 20, an error tends to become large. In this case, the reliability calculation unit 43 is configured to calculate a reliability of a measurement value using a table or a relational expression showing a relationship between measurement values measured by the measurement instrument 20 and reliabilities. In addition, for example, the speed of a response delay of a measurement value varies depending on the measurement instrument 20. In this case, the reliability calculation unit 43 is configured to calculate a reliability of a measurement value using a table or a relational expression showing a relationship between rates of change of measurement values measured by the measurement instrument 20 and reliabilities. That is, since an error due to a response delay becomes larger as the rate of change increases, the reliability calculation unit 43 is configured to evaluate a reliability lower as a rate of change increases. In addition, for example, in the measurement instrument 20, the magnitude of an error of a measurement value may vary depending on the magnitude of another state quantity not to be measured. For example, the reliability of a measurement value of a temperature according to a temperature sensor may vary due to a flow rate of a fluid. In this case, the reliability calculation unit 43 is configured to calculate a reliability of a measurement value using a table or a relational expression showing a relationship between values of other state quantities and reliabilities of measurement values. In addition, for example, in a case where the reliability of a certain measurement instrument 20 does not fluctuate depending on an environment, a fixed value may be used as a reliability of a measurement value.

In addition, the reliability calculation unit 43 may be configured to calculate a reliability of an estimation value based on a reliability of a measurement value used for the estimation of an estimation value and a reliability of a method of calculating an estimation value by the estimation value acquisition unit 42. Also in this case, the reliability calculation unit 43 is configured to calculate a reliability of an estimation value using a table or a relational expression showing a relationship between a measurement value used for estimation, a calculation method, and a reliability of an estimation value.

The extraction unit 44 is configured to extract a group of values related to an identical time and an identical state quantity (the same type in the same portion of the target device 10) from among measurement values acquired by the measurement value acquisition unit 41 and estimation values acquired by the estimation value acquisition unit 42. For example, the extraction unit 44 may be configured to extract a group constituted by values indicating an inlet temperature (an identical state quantity) of a turbine at a time of 0:00:10 (an identical time) from a plurality of measurement values and a plurality of estimation values. Here, the identical time does not necessarily mean that times when measurement values are acquired by the measurement instrument 20 are the same. For example, in a case where the measurement instrument 20 has a response delay, it may be determined whether or not the times are the same with a time specified in consideration of the response delay. In addition, times do not necessarily coincide with each other, and values within a certain error range may be determined to be a set of values related to an identical time. Hereinafter, a group extracted by the extraction unit 44 is referred to as a state value group.

The specification unit 45 is configured to specify a value to be used to manage the target device 10 from state value groups related to an identical time and an identical state quantity which are extracted by the extraction unit 44. The specification unit 45 is configured to specify a value to be used to manage the target device 10 based on a reliability of a measurement value or an estimation value. For example, the specification unit 45 is configured to specify a value having the highest reliability as a value to be used to manage the target device 10.

The management unit 46 is configured to manage the target device 10 based on a value specified by the specification unit 45. Examples of the management of the target device 10 include monitoring regarding whether a state quantity of the target device 10 deviates front an operation allowable range, monitoring regarding whether an output of the target device 10 satisfies a target, output of a control signal to the target device 10, and the like.

<Operation of Management Device>

Figure 3:
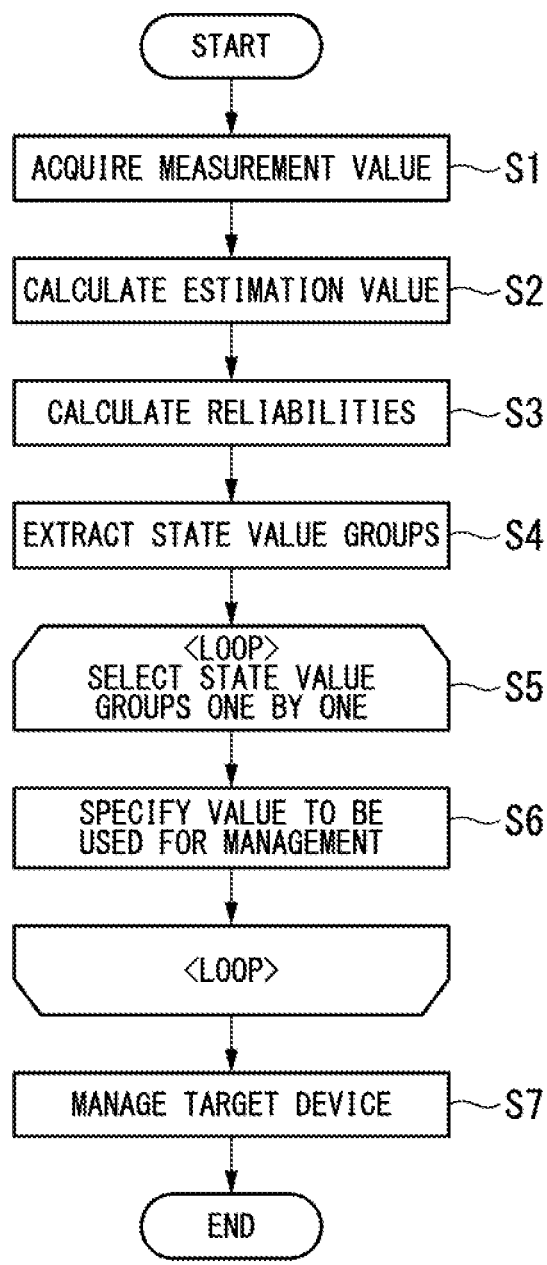
FIG. 3 is a flowchart showing operations of the management device according to the first embodiment.

FIG. 3 is a flowchart showing operations of the management device according to the first embodiment.

When the management device 40 starts to manage the target device 10, the measurement value acquisition unit 41 acquires a measurement value of a state quantity measured by the measurement instrument 20 from the communication device 30 (step S1). Next, the estimation value acquisition unit 42 calculates an estimation value of a state quantity based on the measurement value acquired by the measurement value acquisition unit 41 (step S2). Next, the reliability calculation unit 43 calculates reliabilities of the acquired values (measurement values and estimation values) (step S3).

Next, the extraction unit 44 extracts state value groups related to an identical time and an identical state quantity among the acquired plurality of values (step S4). The specification unit 45 selects the state value groups extracted by the extraction unit 44 one by one (step S5), and specifies a value having the highest reliability among the values included in the selected state group as a value to be used to manage the target device 10 (step S6). In addition, the management unit 46 manages the target device 10 based on measurement values acquired by the measurement value acquisition unit 41, estimation values acquired by the estimation value acquisition unit 42, and the value specified by the specification unit 45 (step S7). Specifically, the management unit 46 manages the target device 10 using a nonoverlapping value (a value that does not constitute a state value group) or using the value specified by the specification unit 45 when values overlap. In a case where the target device 10 is a gas turbine, the target device 10 is managed based on specified management values, for example, by changing a gas turbine output instruction value, changing the setting of an opening of an IGV, or changing a fuel flow rate.

<Functions and Effects>

In this manner, according to the first embodiment, the management device 40 specifies a value to be used to manage the target device 10 from a state value group related to an identical state quantity acquired from the measurement instrument 20 based on reliabilities of values included in the state value group. Thereby, even when overlapping values are acquired as a state quantity of the target device 10, the management device 40 can appropriately specify a value of a state quantity used to manage the target device 10.

In addition, the management device 40 according to the first embodiment includes the estimation value acquisition unit 42 that is configured to acquire estimation values of other state quantities based on a measurement value related to a certain state quantity. Thereby, the management device 40 can estimate a value of a state quantity of a portion incapable of being measured by the measurement instrument 20. In addition, depending on a reliability of an estimation value, the management device 40 can manage the target device 10 using the estimation value instead of a measurement value. On the other hand, the other embodiments are not limited thereto, and the management device 40 may be configured to manage the target device 10 based on only a measurement value.

Second Embodiment

The management device 40 according to the first embodiment is configured to specify a value to be used to manage the target device 10 from a state value group related to an identical state quantity at an identical time. On the other hand, a management device 40 according to a second embodiment is configured to specify a value used to manage a target device 10 from a state value group constituted by a time series of a plurality of values related to an identical state quantity in an identical period. The time series refers to a series of values obtained by continuously observing changes in a state quantity with time. The constitution of the management device 40 according to the second embodiment is the same as that in the first embodiment.

<Operations of Management Device>

Figure 4:
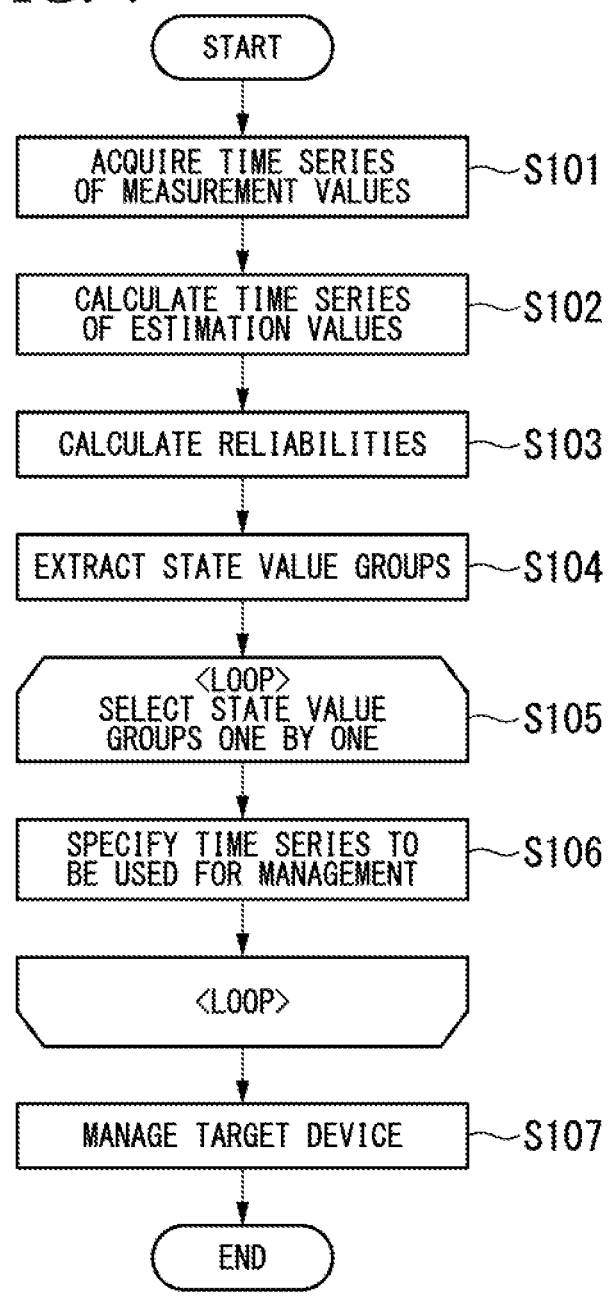
FIG. 4 is a flowchart showing operations of a management device according to a second embodiment.

FIG. 4 is a flowchart showing operations of the management device according to the second embodiment.

When the management device 40 starts to manage the target device 10, the measurement value acquisition unit 41 acquires a measurement value of a state quantity measured by the measurement instrument 20 from the communication device 30 (step S101). In this case, the measurement value acquisition unit 41 specifies a time series of measurement values of each measurement instrument 20. For example, the measurement value acquisition unit 41 specifies a time series of values of an exhaust flow rate measured by a certain exhaust flow rate sensor.

Next, the estimation value acquisition unit 42 calculates an estimation value of a state quantity based on the measurement value acquired by the measurement value acquisition unit 41 (step S102). In this case, the estimation value acquisition unit 42 specifies a time series of estimation values of each estimation device. Meanwhile, in a case where the estimation value acquisition unit 42 estimates values of a state quantity at times during a measurement period of the measurement instrument 20, the estimation value may be added to a time series of measurement values.

Next, the reliability calculation unit 43 calculates reliabilities of the acquired values of time series (measurement values and estimation values) (step S103). Next, the extraction unit 44 extracts a state value group constituted by time series related to an identical period and an identical state quantity among the acquired plurality of time series (step S104). The specification unit 45 selects the state value groups extracted by the extraction unit 44 one by one (step S105), and specifies a value having the largest sum of reliabilities constituting the time series among the time series included in the selected state value group as a time series used to manage the target device 10 (step S106). In addition, the management unit 46 manages the target device 10 based on a time series of measurement values acquired by the measurement value acquisition unit 41, a time series of estimation values acquired by the estimation value acquisition unit 42, and the time series specified by the specification unit 45 (step S107). Specifically, the management unit 46 manages the target device 10 using a nonoverlapping value (a value that does not constitute a state value group) or using the value specified by the specification unit 45 when values overlap.

<Functions and Effects>

In this manner, according to the second embodiment, the management device 40 specifies a time series of values used to manage the target device 10 from a state value group constituted by a time series of values of an identical state quantity in an identical period based on reliabilities of time series included in the state value group. Thereby, it is possible to prevent the origin of a value of a state quantity used to manage the target device 10 from frequently fluctuating. That is, when the origin (whether the origin is a measurement value obtained by the measurement instrument 20 or an estimation value based on a fuel flow rate, or the like) of a value of a state quantity (for example, a temperature of a combustor) is different, there is a possibility that a different value is indicated. In this case, fluctuations in the value of the state quantity become irregular, and thus there is a possibility that it will become difficult to manage the target device 10. Therefore, the management device 40 according to the second embodiment can appropriately manage the target device 10 by specifying a time series of values used to manage the target device 10 from a state value group.

Meanwhile, in the second embodiment, the management device 40 specifics a value having the largest sum of reliabilities constituting a time series as a time series used to manage the target device 10, but is not limited thereto. For example, in other embodiments, a time series used to manage the target device 10 may be specified based on a difference between reliabilities of time series. For example, a case where there are, in terms of a certain state quantity, a time series A of values measured by the measurement instrument 20 having a large error and a small time delay and a time series B of values measured by the measurement instrument 20 having a small error and a large time delay will be described. In this case, in a case where a difference between reliabilities of the time series A and the time series B is equal to or less than a predetermined threshold value, the management device 40 manages the target device 10 using the time series B, and in a case where the difference between reliabilities of the time series A and the time series B is larger than the predetermined threshold value, the management device 40 manages the target device 10 using the time series A.

Further, in other embodiments, the management device 40 may specify a time series used to manage the target device 10 based on a statistic of reliabilities constituting a time series. Specifically, the management device 40 may specify a time series having the lowest degree of scattering, (dispersion, a standard deviation, or the like) of reliabilities constituting the time series as a time series used to manage the target device 10. Further, in other embodiments, the management device 40 may specify a time series having the largest representative value (an average value, a maximum value, or the like) of reliabilities constituting the time series as a time series used to manage the target device 10. Further, in other embodiments, the management device 40 may calculate a weighted average value of time series using weights according to a statistic of reliabilities constituting time series and may specify a time series related to the weighted average value as a time series used to manage the target device 10. Further, in other embodiments, the management device 40 may specify a time series having the smallest difference between a statistic of reliabilities constituting time series and a statistic of reliabilities related to a state quantity in the target device 10 which is specified in advance through experiment or the like as a time series used to manage the target device 10.

Third Embodiment

In the management devices 40 according to the first and second embodiments, the estimation value acquisition unit 42 is configured to estimate values of a state quantity at times during a measurement period of the measurement instrument 20 and specify a value to be used to manage the target device 10 based on the value. On the other hand, a management device 40 according to a third embodiment is configured to determine a value to be used to manage a target device 10 by a specification unit 45 and then complement a value of a state quantity related to a time having no value related to the state quantity using the specified value.

<Configuration of Management Device>

Figure 5:
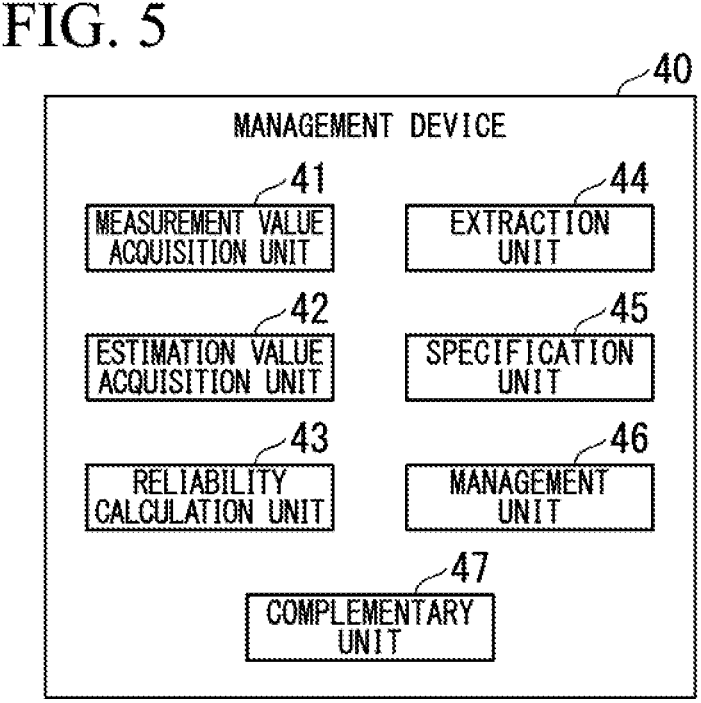
FIG. 5 is a schematic block diagram showing a configuration of a management device according to a third embodiment.

FIG. 5 is a schematic block diagram showing a configuration of the management device according to the third embodiment.

The management device 40 according to the third embodiment further includes a complementary unit 47 in addition to the components in the first embodiment. The complementary unit 47 is configured to complement a value of a state quantity related to a time having no value related to the state quantity by using a value specified by the specification unit 45.

Specifically, in a case where the specification unit 45 adopts a measurement value of a measurement instrument 20A as a state quantity at a time T1 and adopts a measurement value of a measurement instrument 20B as a state quantity at a time T3, the complementary unit 47 complements a value of a state quantity at a time T2 based on the measurement value of the measurement instrument 20A at the time T1 and the measurement value of the measurement instrument 20B at the time T3. For example, the complementary unit 47 may interpolate the value of the state quantity at the time T2 based on the measurement value of the measurement instrument 20A at the time T1 and the measurement value of the measurement instrument 20B at the time T3. In addition, for example, the complementary unit 47 may interpolate a weighted average value to which weights corresponding to reliabilities are applied as the value of the state quantity at the time T2 for the measurement value of the measurement instrument 20A at the time T1 and the measurement value of the measurement instrument 20B at the time T3. In addition, for example, the complementary unit 47 may interpolate a value having a higher reliability out of the measurement value of the measurement instrument 20A at the time T1 and the measurement value of the measurement instrument 20B at the time T3, as the value of the state quantity at the time T2.

<Operations of Management Device>

Figure 6:
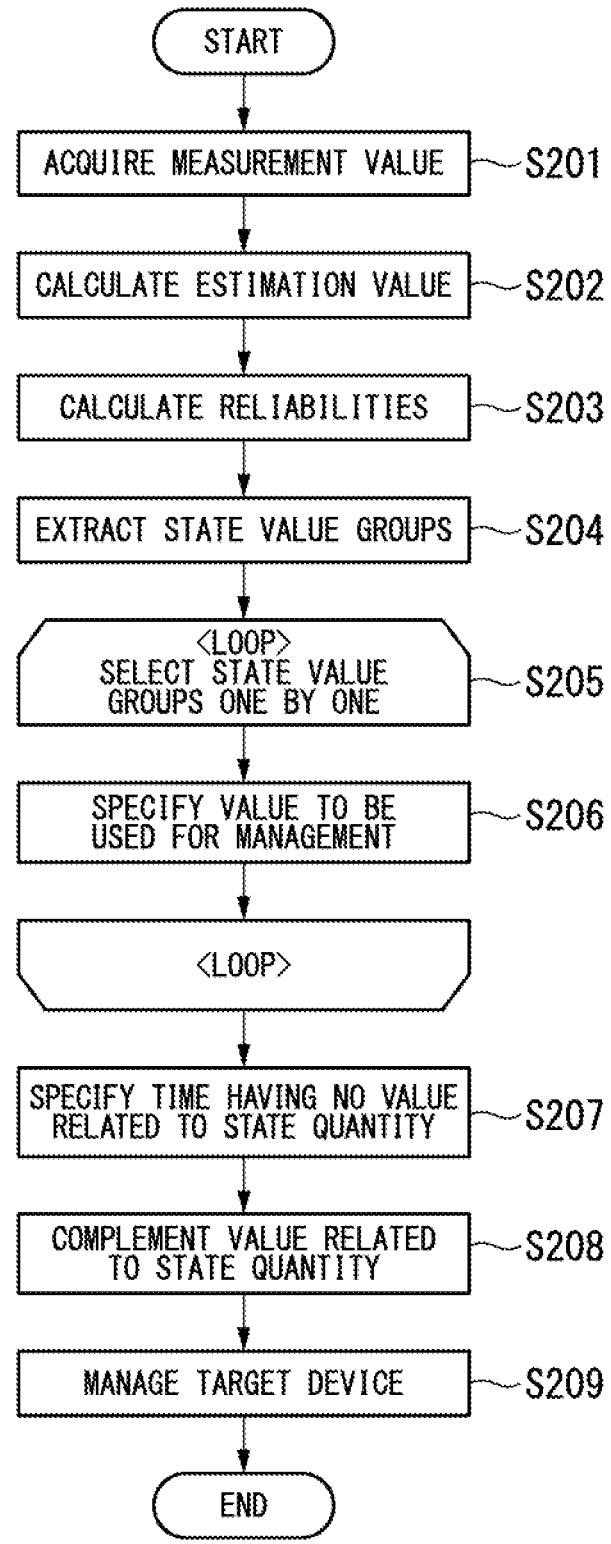
FIG. 6 is a flowchart showing operations of the management device according to the third embodiment.

FIG. 6 is a flowchart showing operations of the management device according to the third embodiment.

When the management device 40 starts to manage the target device 10, the measurement value acquisition unit 41 acquires a measurement value of a state quantity measured by the measurement instrument 20 from the communication device 30 (step S201). Next, the estimation value acquisition unit 42 calculates an estimation value of a state quantity based on the measurement value acquired by the measurement value acquisition unit 41 (step S202). In this case, the estimation value acquisition unit 42 does not estimate values of a state quantity at times during a measurement period of the measurement instrument 20. Next, the reliability calculation unit 43 calculates reliabilities for the acquired values (measurement values and estimation values) (step S203).

Next, the extraction unit 44 extracts state value groups related to an identical time and an identical state quantity among the acquired plurality of values (step S204). The specification unit 45 selects the state value groups extracted by the extraction unit 44 one by one (step S205), and specifies the value having the highest reliability among the values included in the selected state value group as a value to be used to manage the target device 10 (step S206).

Next, the complementary unit 47 specifies a time having no value related to a state quantity based on the value of the state quantity specified by the specification unit 45 (step S207). The complementary unit 47 complements a value of a state quantity related to the time having no value related to the state quantity by using the value specified by the specification unit 45 (step S208). In addition, the management unit 46 manages the target device 10 based on measurement values acquired by the measurement value acquisition unit 41, estimation values acquired by the estimation value acquisition unit 42, the value specified by the specification unit 45, and the value complemented by the complementary unit 47 (step S209).

<Functions and Effects>

In this manner, according to the third embodiment, the management device 40 can complement missing portions of a state quantity of the target device 10 with a reliable value and can make a more appropriate decision by arranging a set of pieces of necessary information in the evaluation of the target device 10. Thereby, it is possible to realize determination that can be performed by using measured values at an identical time, for example, prediction and diagnosis at a fine sample pitch.

Fourth Embodiment

The reliability calculation units 43 of the management devices 40 according to the first to third embodiments is configured to calculate reliabilities of values based on a table or a relational expression showing a relationship between values of state quantities and reliabilities, or the like. On the other hand, a management device 40 according to a fourth embodiment is configured to calculate values of other state quantities based on values included in a state value group and calculate reliabilities based on the calculation results.

<Configuration of Management Device>

Figure 7:
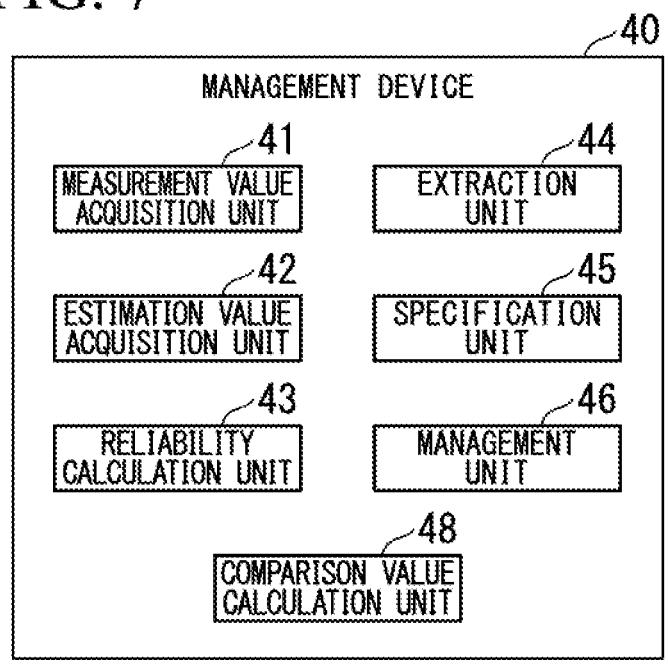
FIG. 7 is a schematic block diagram showing a configuration of a management device according to a fourth embodiment.

FIG. 7 is a schematic block diagram showing a configuration of the management device according to the fourth embodiment.

The management device 40 according to the fourth embodiment further includes a comparison value calculation unit 48 in addition to the components in the first embodiment. The comparison value calculation unit 48 is configured to calculate a comparison value which is a value related to another state quantity (hereinafter, referred to as a comparison state quantity) by using values included in the state value group extracted by the extraction unit 44. For example, the comparison value calculation unit 48 is configured to calculate a temperature of a combustor based on a value related to a pressure of the combustor and set the calculated temperature as a comparison value.

The reliability calculation unit 43 is configured to calculate reliabilities of values included in a state value group based on a difference between the comparison value calculated by the comparison value calculation unit 48 and a measurement value or an estimation value of a comparison state quantity. For example, as the difference between the comparison value and the measurement value or the estimation value becomes smaller, the reliability becomes higher.

<Operations of Management Device>

Figure 8:
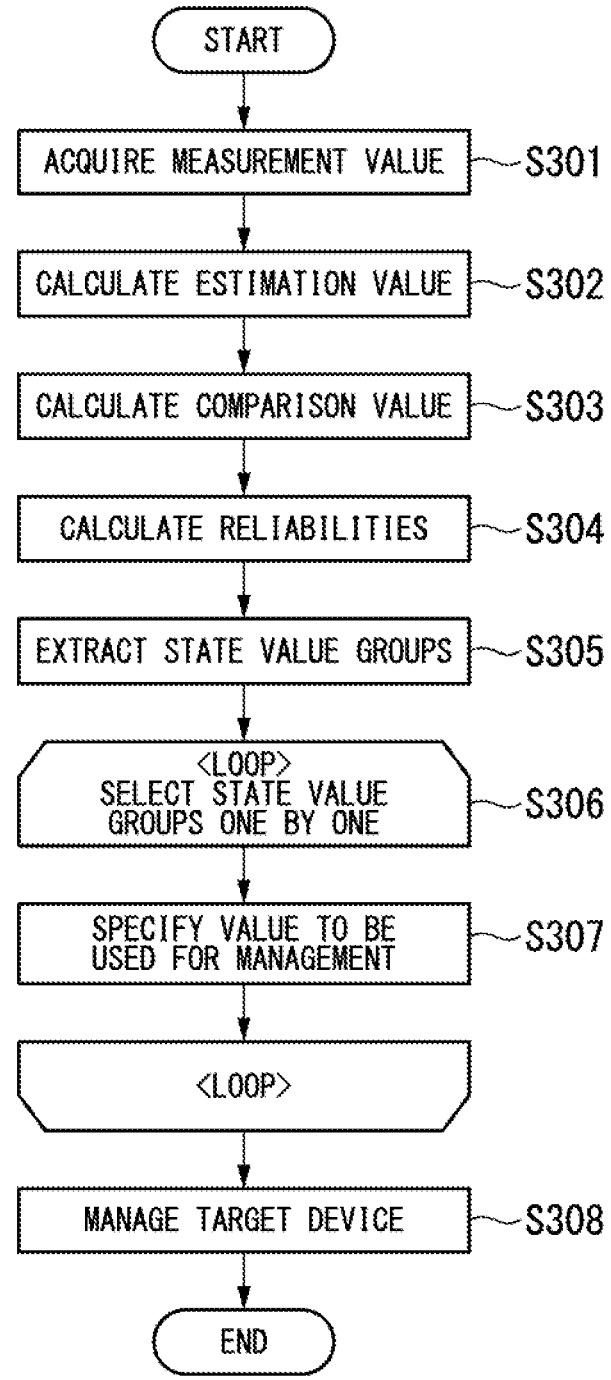
FIG. 8 is a flowchart showing operations of the management device according to the fourth embodiment.

FIG. 8 is a flowchart showing, operations of the management device according to the fourth embodiment.

When the management device 40 starts to manage the target device 10, the measurement value acquisition unit 41 acquires a measurement value of a state quantity measured by the measurement instrument 20 from the communication device 30 (step S301). Next, the estimation value acquisition unit 42 calculates an estimation value of a state quantity based on the measurement value acquired by the measurement value acquisition unit 41 (step S302). Next, the comparison value calculation unit 48 calculates a comparison value which is a value related to a comparison state quantity by using the acquired values (measurement values and estimation values) (step S303). Next, the reliability calculation unit 43 calculates a reliability based on a difference between the comparison value and a measurement value or an estimation value of a comparison state quantity with respect to the acquired values (step S304).

Next, the extraction unit 11 extracts state value groups related to an identical time and an identical state quantity among the acquired plurality of values (step S305). The specification unit 45 selects the state value groups extracted by the extraction unit 44 one by one (step S306), and specifies a value having the highest reliability among the values included in the selected state value group as a value to be used to manage the target device 10 (step S307). In addition, the management unit 46 manages the target device 10 based on measurement values acquired by the measurement value acquisition unit 41, estimation values acquired by the estimation value acquisition unit 42, and the value specified by the specification unit 45 (step S308).

<Functions and Effects>

In this manner, according to the fourth embodiment, the management device 40 can ascertain a reliability at the time of complementing missing portions of a state quantity of the target device 10, can make a decision in accordance with the reliability in the evaluation of the target device 10, and can take an action to improve a reliability such as reacquisition of a state quantity as necessary.

Other Embodiments

Although an embodiment has been described above in detail with reference to the accompanying drawing, a specific configuration is not limited to the above-described configurations, and various modification can be made.

For example, the management device 40 in the management system 1 according to the above-described embodiment has a function of extracting and specifying a value to be used to manage the target device 10, but is not limited thereto. For example, in the management systems 1 according to the other embodiments, an information processing device configured to extract and specify a value to be used to manage the target device 10 may be provided separately from the management device 40, and the management device 40 may be configured to manage the target device 10 using the value specified by the information processing device.

In addition, for example, the management device 40 according to the above-described embodiment is configured to acquire a measurement value through the network N, but is not limited thereto. For example, the management devices according to the other embodiments may be configured to directly acquire a measurement value from the measurement instrument 20. In this case, the management system 1 may not include the communication device 30.

In addition, for example, the management device 40 according to the above-described embodiment is configured to select one value from a state value group and specify the selected value as a value to be used to execute management, but is not limited thereto. For example, the management devices 40 according to the other embodiments may be configured to obtain a weighted average value using weights corresponding to reliabilities from a plurality of values constituting a state value group and specify the weighted average value as a value to be used to execute management.

Figure 9:
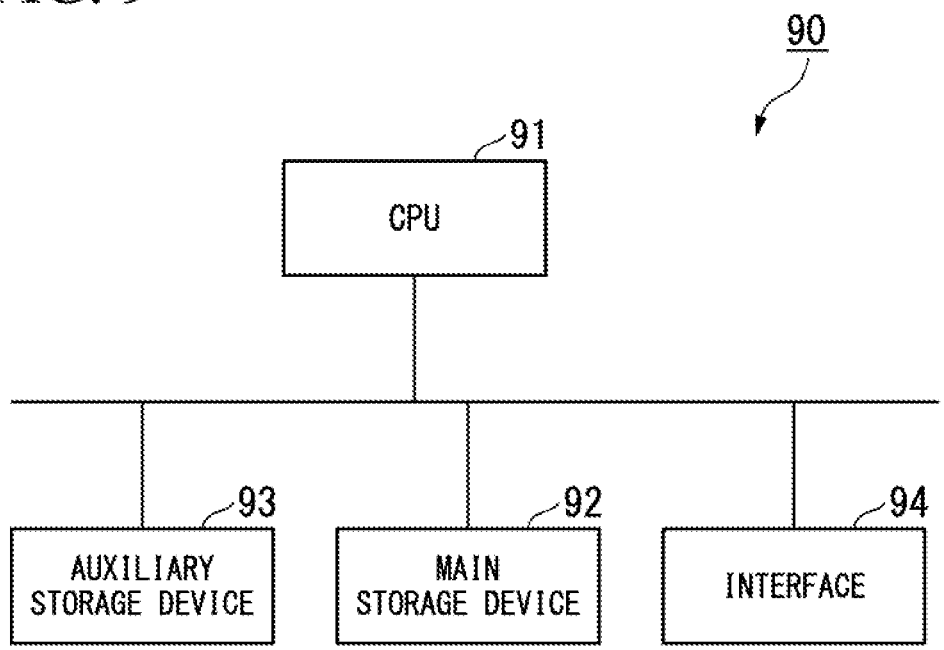
FIG. 9 is a schematic block diagram showing a configuration of a computer according to at least one embodiment.

FIG. 9 is a schematic block diagram showing a configuration of a computer according to at least one embodiment.

A computer 90 includes a CPU 91, a main storage device 92, an auxiliary storage device 93, and an interface 94.

The management device 40 mentioned above is mounted on the computer 90. In addition, operations of the above-described processing units are stored in the auxiliary storage device 93 in a format of a program. The CPU 91 reads out a program from the auxiliary storage device 93, develops the program in the main storage device 92, and executes the above-described processing in accordance with the program.

Examples of the auxiliary storage device 93 include a hard disk drive (HDD), a solid state drive (SSD), a magnetic disc, a magneto-optical disc, a compact disc read only memory (CD-ROM), a digital versatile disc read only memory (DVD-ROM), a semiconductor memory, and the like. The auxiliary storage device 93 may be an internal medium directly connected to a bus of the computer 90 or may be an external medium connected to the computer 90 through the interface 94 or a communication line. Further, in a case where the program is distributed to the computer 90 through a communication line, the computer 90 having the program distributed thereto may develop the program in the main storage device 92 and may execute the above-described processing. In at least one embodiment, the auxiliary storage device 93 is a non-transitory tangible storage medium.

In addition, the program may be a program that realizes some of the above-described functions. Further, the program may be a so-called differential file (differential program) that realizes the above-described functions by a combination with other programs stored in the auxiliary storage device 93 in advance.

INDUSTRIAL APPLICABILITY

The information processing device according to the present invention specifies a value to be used to execute management based on reliabilities of a plurality of values related to an identical state quantity in a case here the plurality of values are acquired. Thereby, the information processing device can appropriately specify a value of a state quantity to be used to manage a target device even when overlapping values are acquired for the state quantity of the target device.

DESCRIPTION OF REFERENCE NUMERALS

1 Management system
10 Target device
20 Measurement instrument
30 Communication device
40 Management device (information processing device)
41 Measurement value acquisition unit
42 Estimation value acquisition emit
43 Reliability calculation unit
44 Extraction unit
45 Specification unit
46 Management unit

The invention claimed is:

1. An information processing device comprising:
a measurement device that is configured to measure a plurality of values related to state quantity of a target device;
a communication device that is configured to transmit the plurality of values related to the state quantity measured by the measurement device through a network to an acquisition unit;
an extraction unit that is configured to extract a state value group constituted by a time series of the plurality of values related to an identical state quantity in an identical period from the acquired plurality of values, which are overlapping, by using the identical state quantity and the identical period as an extraction condition; and
a specification unit that is configured to specify a time series of values to be used to manage the target device in the period from the state value group based on reliabilities of the time series of the values in the state value group.

2. The information processing device according to claim 1, wherein the specification unit is configured to specify a time series of values to be used to manage the target device in the period from the state value group based on a difference between reliabilities in the time series in the state value group.

3. The information processing device according to claim 1, wherein the acquisition unit is configured to acquire a plurality of measurement values related to a state quantity of the target device from a measurement instrument provided in the target device, and acquire an estimation value by estimating other state quantities based on the measurement value.

4. The information processing device according to claim 3, wherein the acquisition unit is configured to acquire an estimation value related to a state quantity of the target device based on a measurement value related to a state quantity of a device different from the target device.

5. The information processing device according to claim 1, further comprising:
a complementary unit that is configured to complement a value of the state quantity related to a time having no value related to the state quantity based on a value specified by the specification unit.

6. The information processing device according to claim 1, further comprising:
a comparison value calculation unit that is configured to calculate a comparison value which is a value related to another state quantity by using values included in the state value group; and
a reliability calculation unit that is configured to calculate reliabilities of values included in the state value group based on a difference between the value of the other state quantity acquired by the acquisition unit and a comparison value calculated by the comparison value calculation unit.

7. The information processing device according to claim 1, wherein the specification unit is configured to specify a value to be used to manage the target device based on a statistic of values included in the state value group.

8. The information processing device according to claim 1, wherein the specification unit is configured to specify a weighted average value of the values related to the state value group using weights corresponding to the reliabilities of the values included in the state value group as a value to be used to manage the target device.

9. An information processing method comprising:
measuring a plurality of values related to state quantity of a target device;
transmitting the plurality of values related to the state quantity measured by the measurement device through a network to an acquisition unit;
extracting a state value group constituted by a time series of the plurality of values related to an identical state quantity in an identical period from the acquired plurality of values, which are overlapping, by using the identical state quantity and the identical period as an extraction condition; and
specifying a time series of values to be used to manage the target device in the period from the state value group based on reliabilities of the time series of the values in the state value group.

10. A non-transitory computer-readable medium that stores a program causing a computer to:
measuring a plurality of values related to state quantity of a target device;
transmitting the plurality of values related to the state quantity measured by the measurement device through a network to an acquisition unit;
extract a state value group constituted by a time series of the plurality of values related to an identical state quantity in an identical period from the acquired plurality of values, which are overlapping, by using the identical state quantity and the identical period as an extraction condition; and
specify a time series of values to be used to manage the target device in the period from the state value group based on reliabilities of the time series of the values in the state value group.

* * * * *